United States Patent [19]
Brown

[11] Patent Number: 4,986,231
[45] Date of Patent: Jan. 22, 1991

[54] PISTON WITH GRAPHITE FIBER MESH

[75] Inventor: Peter W. Brown, Hartland, Wis.

[73] Assignee: Outboard Marine Corporation, Waukegan, Ill.

[21] Appl. No.: 347,451

[22] Filed: May 4, 1989

[51] Int. Cl.$^5$ .................................... F02F 3/00
[52] U.S. Cl. .......................... 123/193 P; 164/97; 92/212; 29/888.046
[58] Field of Search ............ 123/193 P; 92/212, 222, 92/225; 29/156.5 R, 527.6; 164/97, 98

[56] References Cited

U.S. PATENT DOCUMENTS

| | | | |
|---|---|---|---|
| 1,842,745 | 1/1932 | Butler | 92/214 |
| 1,979,498 | 11/1934 | Short | 92/224 |
| 2,026,611 | 1/1936 | Chase | 92/224 |
| 2,271,024 | 1/1942 | Nicolle et al. | 92/224 |
| 2,438,243 | 3/1948 | Zoromskis | 92/224 |
| 2,806,751 | 9/1957 | Sykes | 92/224 |
| 2,833,264 | 5/1958 | Dailey et al. | |
| 2,833,668 | 5/1958 | Dailey et al. | |
| 3,004,336 | 10/1961 | Timuska | 92/224 |
| 3,289,649 | 12/1966 | Lamm | |
| 3,758,298 | 9/1973 | Eppich | 164/97 |
| 3,783,068 | 1/1974 | Brown | |
| 3,853,635 | 12/1974 | Demendi | 164/97 |
| 3,890,950 | 6/1975 | Haldeman | 123/193 P |
| 4,450,610 | 5/1984 | Schaper | 92/212 |
| 4,508,158 | 4/1985 | Amateau et al. | 164/97 |
| 4,653,569 | 3/1987 | Tank et al. | 164/97 |
| 4,679,493 | 7/1987 | Munro et al. | 92/212 |
| 4,708,104 | 11/1987 | Day et al. | 164/97 |
| 4,755,437 | 8/1988 | Sabatie et al. | 164/97 |

FOREIGN PATENT DOCUMENTS 0041428  3/1984  Japan ..................................... 164/97

Primary Examiner—Andrew M. Dolinar
Assistant Examiner—M. Macy
Attorney, Agent, or Firm—Michael, Best & Friedrich

[57] ABSTRACT

Disclosed herein is a method of manufacturing a piston comprising the steps of providing a shell comprising graphite fibers formed to include the general shape of an open-ended cylinder having an outer periphery, and casting metal to form at least a portion of the piston so that the shell is included and at least a portion of the outer periphery of the shell is exposed. Also disclosed herein is a piston comprising a mesh of graphite fibers having a generally cylindrical shape and defining mesh voids, structural material filling at least some of the mesh voids so that an exterior cylindrical surface of the piston is defined to include at least portions of at least some of the fibers.

11 Claims, 1 Drawing Sheet

U.S. Patent  Jan. 22, 1991  4,986,231
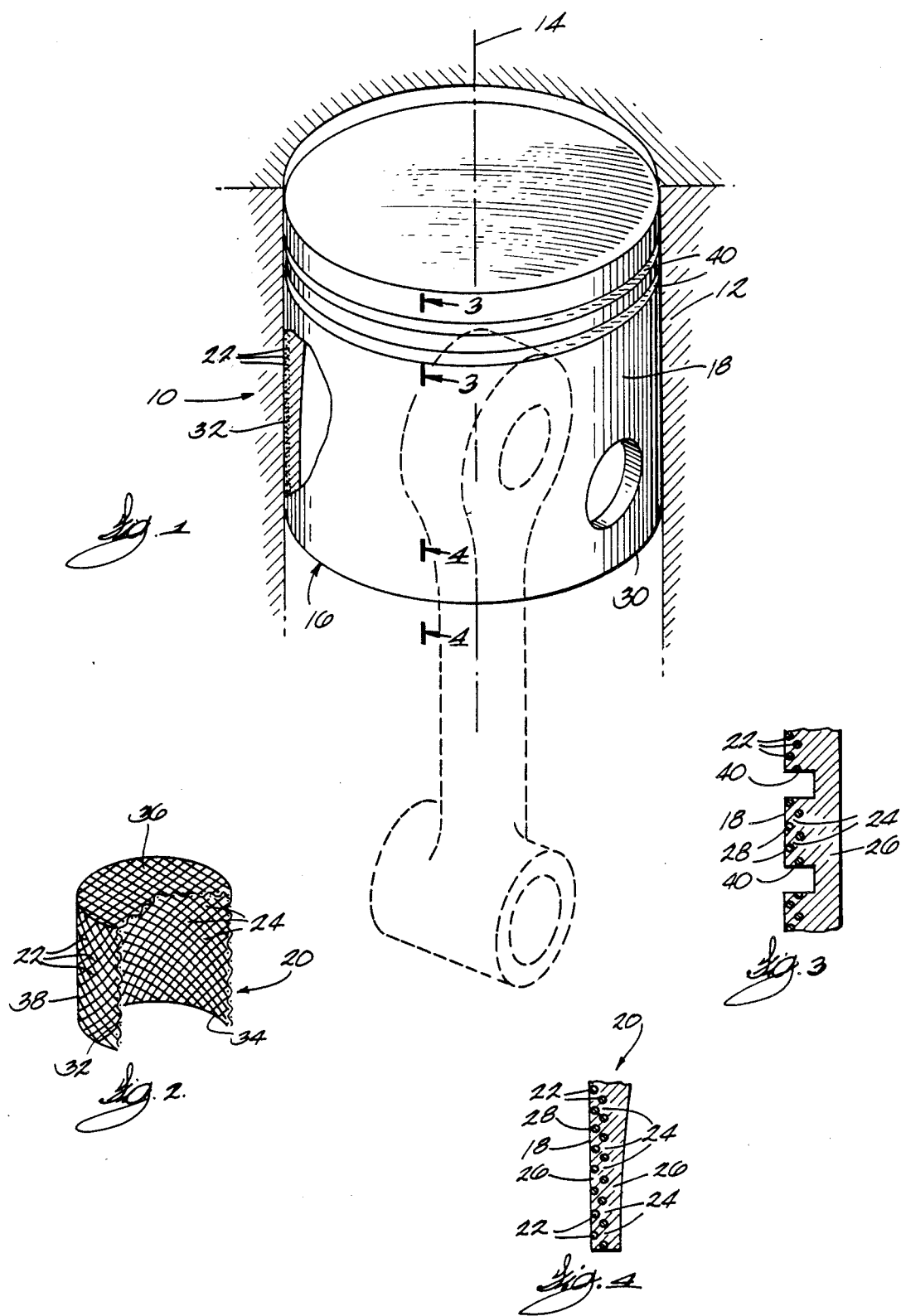

PISTON WITH GRAPHITE FIBER MESH

BACKGROUND OF THE INVENTION

The invention relates generally to cylindrical objects movable in cylindrical bores, and more particularly, to pistons reciprocal in cylinders.

When a first work object in contact with a second work object is caused to move relative to the first work object, such as when a piston reciprocates in a cylinder, and when little or no lubrication is provided to reduce friction between the first work object and the second work object, wear of both the first and second work objects occurs.

Attention is directed to the following U.S. Patent references which relate to pistons:

SUMMARY OF THE INVENTION

The invention provides a method of manufacturing a piston comprising the steps of providing a shell comprising graphite fibers formed to include the general shape of an open-ended cylinder having an outer periphery, and casting metal to form at least a portion of the piston so that the shell is included and at least a portion of the outer periphery of the shell is exposed.

In one aspect of the invention, a method of manufacturing a piston is provided comprising the steps of forming a mesh of woven graphite fibers arranged to include mesh voids between the fibers and into the general shape of a cylinder having a cylindrical portion, an open end, and a closed end, casting metal around the mesh so that the mesh voids are filled, and so that a work object is formed, and machining the work object to form at least a portion of the piston so that graphite from the cylindrical portion of the mesh is generally uniformly peripherally exposed.

In another aspect of the invention, a piston is manufactured by the steps of providing a shell comprising graphite fibers formed to include the general shape of an open-ended cylinder having an outer periphery, and casting metal around the shell to form at least a portion of the piston and so that the shell is included and so that at least a portion of the outer periphery of the shell is exposed.

In another aspect of the invention, a piston is provided comprising a mesh of graphite fibers having a generally cylindrical shape and defining mesh voids, structural material filling at least some of said mesh voids so that an exterior cylindrical surface of said piston is defined to include at least portions of at least some of said fibers.

In a further aspect of the invention, an apparatus is provided comprising a first component, and a second component having a surface which is adapted to frictionally contact said first component and which is movable with respect to said first component, said second component comprising a mesh of graphite fibers defining mesh voids and structural material filling at least some of said mesh voids such that said surface includes at least portions of at least some of said fibers.

Other features and advantages of the invention will become apparent to those skilled in the art upon review of the following detailed description, claims and drawings.

THE DRAWINGS

FIG. 1 is a perspective view of an apparatus, partly in section, incorporating various of the features of the invention.

FIG. 2 is a perspective view, partially in section, of a shell of graphite fibers used in the manufacture of the piston shown in FIG. 1.

FIG. 3 is a view of a section taken along line 3—3 of FIG. 1.

FIG. 4 is a view of a section taken along line 4—4 of FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Shown in FIG. 1 is an apparatus 10 comprising a first component 12. While various configurations could be employed, in the illustrated embodiment the first component 12 comprises a member defining a path of travel 14, which member could be an engine block of an internal combustion engine or a body of a compressor, for example.

The apparatus 10 further comprises a second component 16 having a surface 18 which is adapted to frictionally contact the first component 12 and which is movable with respect to the first component 12. The second component 16 includes a shell 20 (see FIG. 4) of graphite fibers 22. In the preferred embodiment, the shell 20 is defined by a mesh of woven graphite fibers (see FIG. 2) defining mesh voids 24, and structural material 26 filling at least some of the mesh voids 24 such that the surface 18 includes at least portions 28 of at least some of the fibers 22. While various types of structural material 26 could be employed, the structural material 26 employed in the illustrated embodiment is selected from materials appropriate for use in a piston of an internal combustion engine. For example, the structural material 26 could be a metal such as steel or aluminum.

While various other constructions could be employed, the second component 16 illustrated in FIG. 1 defines at least a portion of a piston 30, for example a piston skirt. Also, in FIG. 2, the shell 20 of graphite fibers 22 includes a generally cylindrical shape, and the surface 18 of the second component 16 has a corresponding cylindrical peripheral shape with the portions 28 of the fibers 22 generally uniformly peripherally exposed. While various other cylindrical shapes could be employed, the shell 20 shown in FIG. 2 and included in the second component 16 shown in FIG. 1 includes a cylindrical portion 32, an open end 34, a closed end 36, and a cylindrical outer periphery 38.

A method of manufacturing a piston such as the piston 30 will now be described.

First, a shell is provided comprising graphite fibers formed to include the general shape of an open-ended cylinder having an outer periphery. More particularly, the shell 20 shown in FIG. 2 is employed. The shell 20 comprises the graphite fibers 22 formed to include the general shape of an open-ended cylinder having an outer periphery 38.

Next, metal is cast to form at least a portion of the piston 30 so that the shell 20 is included and at least a portion of the outer periphery 38 of the shell 20 is exposed.

In an alternate method, a mesh of woven graphite fibers is first arranged to include mesh voids between the fibers and into the general shape of a cylinder having a cylindrical portion, an open end, and a closed end. More particularly, the shell 20 shown in FIG. 2 is employed. The shell 20 is defined by the mesh of woven graphite fibers 22 which define the mesh voids 24, the cylindrical portion 32, the open end 34, and the closed end 36.

Metal is then cast around the mesh so that the mesh voids 24 are filled and so that a work object is formed.

The work object is then machined to form at least a portion of the piston 30 so that graphite from the cylindrical portion 32 of the mesh is generally uniformly peripherally exposed.

Optionally, the piston 30 may also be machined to include grooves 40 for piston rings (not shown).

Various of the features of the invention are set forth in the following claims.

What is claimed:

1. A method of manufacturing a piston comprising the steps of providing a shell comprising graphite fibers formed to include the general shape of an open-ended cylinder having an outer cylindrical periphery, and casting metal to form at least a portion of the piston so that the shell is included and at least a portion of the outer cylindrical periphery of the shell is exposed.

2. A method of manufacturing a piston comprising the steps of forming a mesh of woven graphite fibers arranged to include mesh voids between the fibers and into the general shape of a cylinder having a cylindrical portion, an open end, and a closed end, casting metal around the mesh so that the mesh voids are filled, and so that a work object is formed, and machining the work object to form at least a portion of the piston so that graphite from the cylindrical portion of the mesh is generally uniformly peripherally exposed.

3. A piston manufactured by the steps of providing a shell comprising graphite fibers formed to include the general shape of an open-ended cylinder having an outer cylindrical periphery, and casting metal around the shell to form at least a portion of the piston and so that the shell is included, and so that at least a portion of the outer cylindrical periphery of the shell is exposed.

4. A piston comprising a mesh of graphite fibers having a generally cylindrical shape and defining mesh voids, and structural material filling at least some of said mesh voids so that an exterior cylindrical surface of said piston includes at least portions of at least some of said fibers.

5. A piston in accordance with claim 4 wherein said mesh comprises a woven mesh of said graphite fibers.

6. A piston in accordance with claim 5 wherein said mesh is in the general form of a cylinder having one closed end.

7. A piston in accordance with claim 4 wherein said structural material comprises metal.

8. A piston in accordance with claim 4 wherein graphite from said graphite fibers is generally uniformly peripherally exposed.

9. An apparatus comprising a first component, and a second component having an outer cylindrical surface which is adapted to frictionally contact said first component and which is movable with respect to said first component, said second component comprising a mesh of graphite fibers defining mesh voids and structural material filling at least some of said mesh voids such that said outer cylindrical surface includes at least portions of at least some of said fibers.

10. An apparatus in accordance with claim 9 wherein said second component defines at least a portion of a piston.

11. An apparatus in accordance with claim 9 wherein said mesh of graphite fibers includes a generally cylindrical shape, and wherein said surface has a corresponding generally cylindrical peripheral shape with said portions of said fibers generally uniformly peripherally exposed.

* * * * *